INVENTOR.
Norman G. Anderson

BY

ATTORNEY.

Jan. 19, 1971  N. G. ANDERSON  3,556,967
ELECTROPHORETIC SEPARATION UTILIZING LIQUID CENTRIFUGE
Filed Aug. 29, 1968  3 Sheets-Sheet 3

INVENTOR.
Norman G. Anderson
BY
Roland A. Anderson
ATTORNEY.

3,556,967
ELECTROPHORETIC SEPARATION UTILIZING
LIQUID CENTRIFUGE
Norman G. Anderson, Oak Ridge, Tenn., assignor to the
United States of America as represented by the United
States Atomic Energy Commission
Filed Aug. 29, 1968, Ser. No. 756,264
Int. Cl. B01d 13/02
U.S. Cl. 204—180                                    5 Claims

ABSTRACT OF THE DISCLOSURE

A method and apparatus are described for separating macromolecular components by electrophoresis in a liquid density gradient while it is being stabilized in a centrifugal field. A modified pancake-type centrifuge rotor is used which contains two radially extending compartments in open communication at their radial peripheries. Electrodes, in electrical communication with externally mounted contact or commutator rings, are disposed within the axial region of each compartment. While the motor is rotating, a liquid density gradient and then a sample are introduced into at least one rotor compartment and direct current applied to the electrodes causing electrophoretic separation of separable components contained in the sample. The liquid density gradient and separated components contained therein are then removed from the rotor by conventional displacement techniques.

BACKGROUND OF THE INVENTION

The invention described herein relates generally to electrophoretic separation of macromolecular substances, and more particularly to a method and apparatus for the effecting an electrophoretic separation in a liquid density gradient stabilized by centrifugal force. It was made in the course of, or under, a contract with the U.S. Atomic Energy Commission.

In the field of biochemistry it is often desirable to separate proteins or other macromolecular substances. The general principle of electrophoresis has been used to bring about such a separation. Such separaton occurs when the materials to be separated are caused to migrate in a liquid carrier between two spaced-apart electrodes. The separation is brought about by the fact that the migration velocities are different for different ions or charged molecules.

Electrophoresis in a liquid density gradient has been widely used to separate proteins and other macromolecular substances. A limiting factor which exists in electrophoresis of this type is that heat must be transferred from the liquid density gradient to minimize thermal mixing which reverses the separative effect. Such requirement limits the distance between any point in the gradient and a cooling surface for removing heat. A variety of arrangements for maximizing the cooling surface area have been proposed but have been deemed undesirable because of increased mixing caused by laminar flow during unloading. Thus, if a gradient is enlarged by placing it between two vertical cooling plates which are long in a horizontal direction, good cooling may be obtained, but at the cost of considerable difficulty in recovering the density gradient with good resolution.

It is, accordingly, a general object of the invention to provide a method and apparatus for effecting an electrophoretic separation and recovery in a stabilized liquid density gradient where mixing is minimized.

SUMMARY OF THE INVENTION

In accordance with the invention, a method and apparatus are provided for separating macromolecular substances by electrophoresis in a liquid density gradient while it is being stabilized in a centrifugal field. A modified pancake-type rotor, containing two radially extending compartments in open communication at their radial peripheries, is used to apply a centrifugal field to the liquid density gradient. Electrodes, in electrical communication with externally mounted contact or commutator rings, are disposed within the axial region of each compartment. While the rotor is rotating, the liquid density gradient and then a sample are introduced into an least one rotor compartment and direct current applied to the electrodes causing electrophoretic separation of separable substances contained in the sample. The liquid density gradient and separated substances contained therein are then displaced from the rotor. Such method and apparatus facilitate heat removal by providing large cooling surfaces while minimizing mixing because of the stabilizing effect of the centrifugal field on the density gradient.

DESCRIPTION OF THE PREFERRED EMBODIMENT

Figure 1:
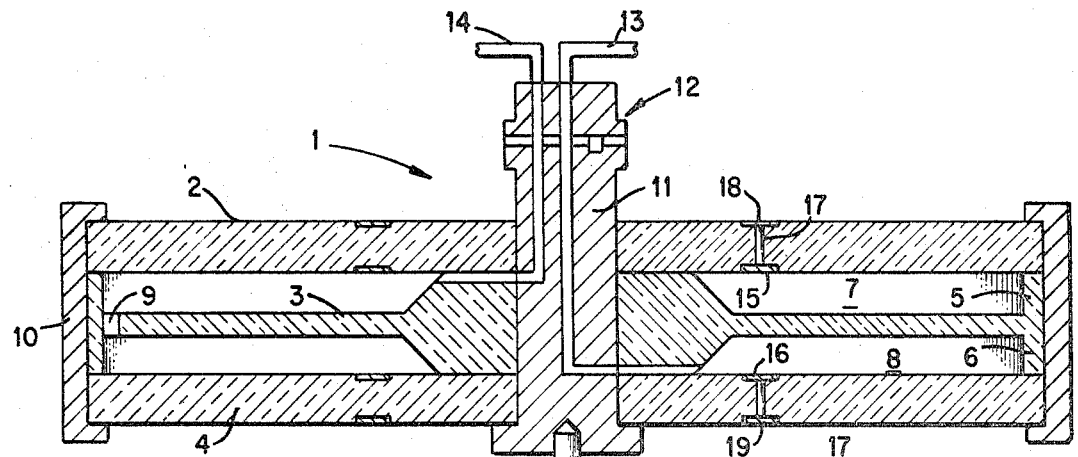
FIG. 1 is a schematic illustration of a liquid centrifuge utilizing a modified pancake-type rotor suitable for carrying out the method of the present invention.

A modified pancake-type centrifuge suitable for carrying out the method of the invention is schematically illustrated in FIG. 1 of the drawings. The rotor bowl 1 comprises a top plate 2, center plate 3, and bottom plate 4 of transparent nonconductive material such as cast acrylic resin. Center plate 3 is provided with axially extending lips 5 and 6 about its periphery sealably engaging top plate 2 and bottom plate 9, respectively, and thereby defining radially extending top and bottom chambers 7 and 8. Top and bottom chambers 7 and 8 are in open communication with each other through a series of perforations 9 spaced about the periphery of center plate 3 at points adjacent lips 5 and 6. An annular metal band or ring 10 engages the periphery of plates 2, 3, and 4 to provide radial support thereto and to hold them together in a tight-sealed engagement at their peripheries. A central shaft or core 11, fabricated of metal for greater strength, penetrates the center of plates 2, 3, and 4 in order to provide support and rotational driving force thereto while serving as a conduit for inserting and removing fluids from chambers 7 and 8. A rotating face seal 12 permits two fluid lines to be connected to the rotor bowl through shaft 11 for fluid insertion and removal while the rotor bowl is rotating. As shown, bottom chamber 8 communicates through shaft or core 11 directly with central fluid line 13, while top chamber 7 connects through shaft 11 to edge fluid line 14. Annular platinum or other corrosion resistant metal electrodes 15 and 16 are mounted internally within the top and bottom chamber 7 and 8 and are connected through leads 17 to respective annular copper contact or commutator rings 18 and 19 mounted externally on top and bottom plates 2 and 4. A centrifuge drive and damping system 20 supports and rotates rotor bowl 1.

Figure 2:
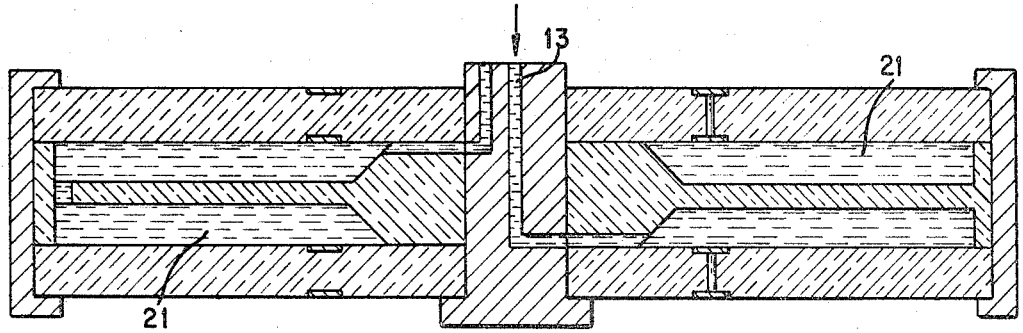
FIG. 2 illustrates the rotor of FIG. 1 filled with a high-density underlay liquid.
Figure 3:
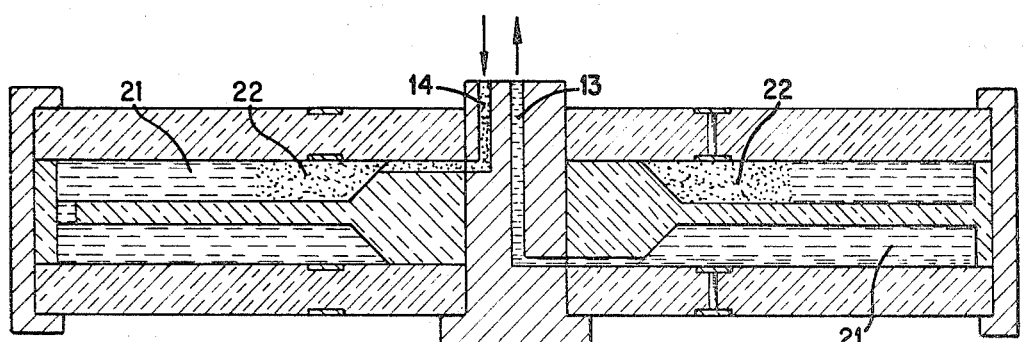
FIG. 3 illustrates the rotor of FIG. 2 after a portion of the underlay liquid has been displaced by a liquid density gradient.

Referring now to FIGS. 2 through 5, a series of views are presented illustrating progressively the use of the centrifuge of FIG. 1 to achieve an electrophoretic separation of macromolecular substances in a sample mixture. As shown in FIG. 2, the rotor is first filled through central fluid line 13 with a high density liquid underlay 21 while at rest. When top chamber 7 is almost filled, the rotor is accelerated to about 1000 revolutions per minute to force out air bubbles. The bowl is then completely filled with liquid underlay and, while it continues to rotate, a liquid of graded density 22 is pumped through edge fluid line 14 into top chamber 7 as shown in FIG. 3, thereby displacing a portion of the dense underlay 21 out through central fluid line 13. The liquid of graded density, hereafter referred to as the density gradient, is introduced high density end first into chamber 7. Such orientation ensures a stable gradient as the density of the liquid increases in the radially outward direction and the centrifugal effect provided by the spinning rotor is also directed radially outward.

Figure 4:
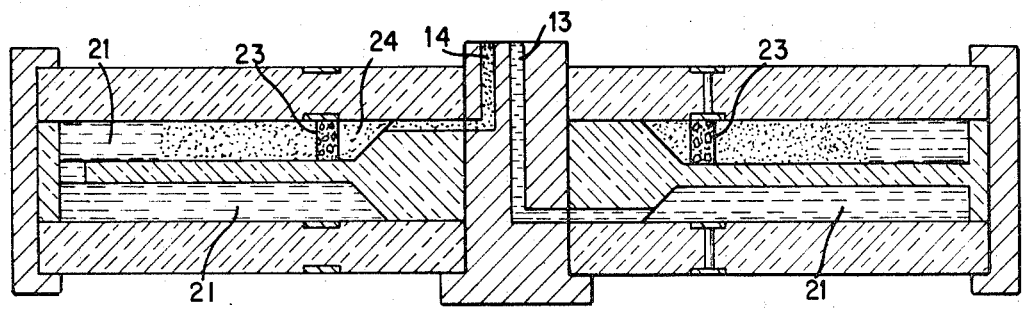
FIG. 4 illustrates the rotor of FIG. 3 with the underlay liquid further displaced by the insertion of a sample followed by a low density overlay liquid.
Figure 5:
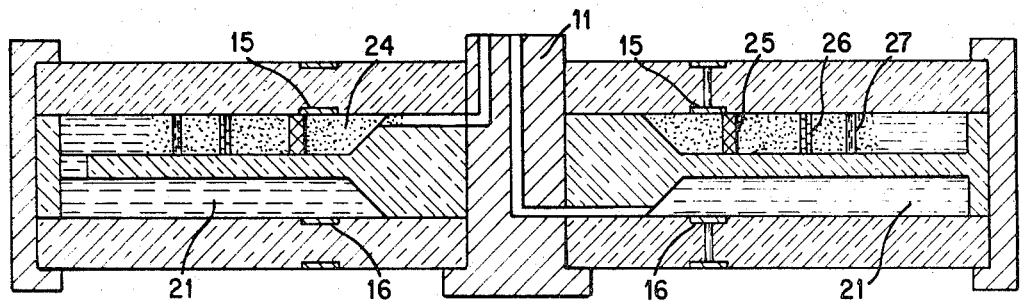
FIG. 5 illustrates the separation of sample components within the the liquid density gradient following electrophoresis.

As shown in FIG. 4, a sample 23 containing a mixture of macromolecular components is next introduced through edge line 14 into top chamber 7 followed by a low density overlay 24, thereby further displacing a portion of underlay 21 from the rotor through fluid line 13. The liquid level is then adjusted in chambers 7 and 8, as shown in FIG. 5, so that the centripetal edges of the overlay liquid 24 and underlay liquid 21 are spaced apart from core 11. At this point a direct current is passed from electrodes 15 to electrodes 16 to effect an electrophoretic separation of macromolecular components within sample 23. After direct current has been passed through the overlay, sample, liquid gradient, and underlay for a period of time, the separable components become concentrated in discrete radial bands as illustrated in FIG. 5 by reference numerals 25, 26, and 27. More or less than three components may be separated depending on the particular sample undergoing electrophoresis. When such separation has been accomplished, the separated components are ready for a recovery operation, as illustrated in FIG. 6.

Figure 6:
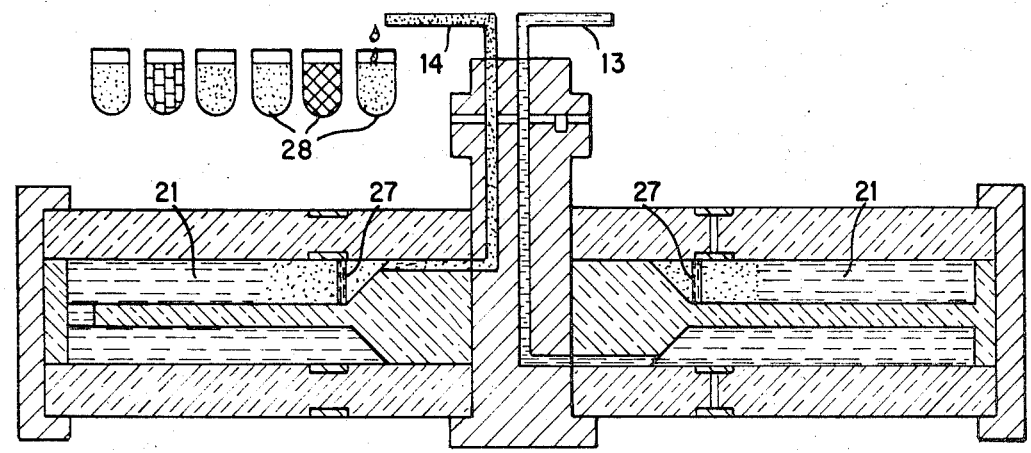
FIG. 6 illustrates the recovery of the separated components by displacement of the liquid density gradient from the rotor.

In FIG. 6 the contents of the rotor bowl are shown being displaced from the rotor into a series of test tubes 28. Dense underlay is pumped through center fluid line 13 into bottom chamber 8, thereby forcing the overlay and liquid gradient out through edge line 14. A sensing device such as a recording spectrophotometer (not shown) may be used to monitor the outflow of liquid through line 14 in order to help identify various separated components as they pass from the rotor. Such monitoring is especially useful where one or more separated components are not visible to the naked eye.

EXAMPLE

Figure 7:
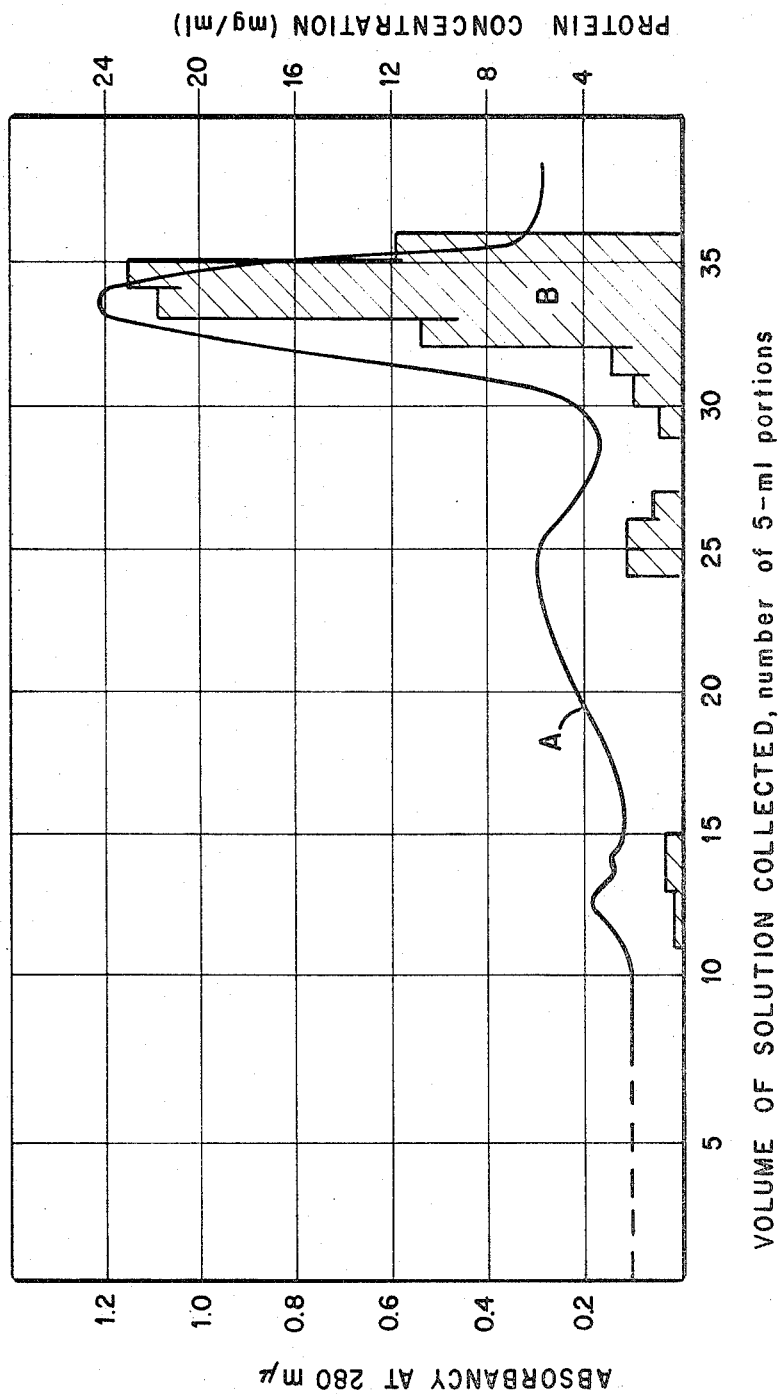
FIG. 7 is a graph illustrating the results of an electrophoretic separation of serum from tumor-bearing hamsters.

Serum from tumor-bearing hamsters was analyzed in an electrophoretic separation made according to the method of the invention and using a centrifuge substantially as described herein. The results of the separation are shown in FIG. 7 where it can be seen that good resolution of three serum components was obtained. Curve A of FIG. 7 represents the light absorbency of the solution as it was withdrawn from the rotor and passed through a spectrophotometer. Peaks in the absorbency of the solution occurred at those points where serum components were concentrated, including one between the eleventh and fifteenth portion collected which was not visible to the human eye as containing any such concentration. Approximately 90 percent of the antigen from the soluble protein was concentrated in the albumen band as illustrated by the shaded area B.

The run was made with the rotor filled with a 67 percent sucrose solution buffered to pH 8.5. A preformed liquid density gradient varying from 10 to 55 weight percent sucrose was then introduced into the top chamber displacing an equal volume of underlay from the rotor while it was rotated at 1000 revolutions per minute. A sharp interface between the underlay and 55 weight percent sucrose end of the density gradient was observed. The serum sample was then introduced followed by a low density buffer without sucrose. A further portion of the underlay was displaced leaving a volume of air next to the central core of the rotor in order to electrically isolate the core and prevent shorting of electric current therethrough. A constant current of 450 milliamps was then passed from electrodes 15 through the overlay, density gradient, and underlay to electrode 16 for a period of about 2 hours. Two distinct bands were observed to appear as the electrophoresis proceeded.

During the period of electrophoresis the most rapidly migrating sample component (the albumen band) moved radially outward a distance of 1.25 inches. Following the migration, the electric current was stopped and the contents of the rotor forced out through the edge fluid line by displacement with dense underlay. The displaced liquid density gradient containing the separated sample components was directed through a recording spectrophotometer and finally collected in 5-milliliter fractions.

The rotor used was approximately 13 inches in diameter and 2.5 inches in axial height with a capacity of 1400 milliliters.

What is claimed is:
1. An improved method for effecting an electrophoretic separation comprising:
 (a) filling a centrifuge rotor bowl with a first liquid, said rotor bowl defining at least one radially extending chamber for receiving said first liquid;
 (b) inserting, while said rotor bowl is rotating, a second liquid of graded density into said rotor bowl, said second liquid defining a density gradient in the radial direction within said chamber, said second liquid partially displacing said first liquid;
 (c) inserting, while said rotor bowl is rotating, a sample containing electrophoretically separable components into said rotor bowl in a region adjacent to and in contact with said second liquid;
 (d) passing, while said rotor bowl is rotating, a direct current through said sample and said second liquid, said direct current causing an electrophoretic migration of said separable components to different radial zones within second liquid; and
 (e) displacing said second liquid and separated components contained therein from said rotor bowl.

2. The method of claim 1 wherein said first liquid is of greater density than said second liquid.

3. The method of claim 1 wherein the density of said second liquid increases with increasing radial distances from the center of rotation of said rotor bowl after said second liquid is inserted into said bowl.

4. The method of claim 1 wherein said second liquid and separated components contained therein are displaced from said rotor bowl by pumping a liquid of greater density into said bowl.

5. The method of claim 1 wherein said second liquid and separated components contained therein are collected in a multiplicity of discrete and separate holders upon being displaced from said rotor bowl.

References Cited

UNITED STATES PATENTS

| | | | |
|---|---|---|---|
| 1,016,097 | 1/1912 | Ruprecht | 204—180 |
| 2,057,156 | 10/1936 | Lyons | 204—180 |
| 3,005,763 | 10/1961 | Kollsman | 204—180P |
| 3,196,095 | 7/1965 | Wadsworth | 204—180 |
| 3,413,208 | 11/1968 | Barg et al. | 204—180 |

TA-HSUNG TUNG, Primary Examiner

U.S. Cl. X.R.

204—299